(12) United States Patent
Basse

(10) Patent No.: US 7,596,278 B2
(45) Date of Patent: *Sep. 29, 2009

(54) METHODS AND APPARATUS FOR MONITORING COMPRESSED BITSTREAMS

(75) Inventor: Hanno Basse, Santa Monica, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/105,580

(22) Filed: Apr. 18, 2008

(65) Prior Publication Data

US 2008/0196077 A1    Aug. 14, 2008

Related U.S. Application Data

(63) Continuation of application No. 10/425,120, filed on Apr. 28, 2003, now Pat. No. 7,424,160.

(51) Int. Cl.
*G06K 9/36* (2006.01)
(52) U.S. Cl. .................................... 382/236
(58) Field of Classification Search .............. 382/232, 382/236; 348/180, 184; 375/240.26, 240.27; 386/111, 113
See application file for complete search history.

(56) References Cited

U.S. PATENT DOCUMENTS

| | | | |
|---|---|---|---|
| 5,390,259 | A | 2/1995 | Withgott et al. |
| 5,771,316 | A | 6/1998 | Uz |
| 5,812,699 | A | 9/1998 | Zhu et al. |
| 5,818,540 | A | 10/1998 | Mies et al. |
| 5,911,008 | A | 6/1999 | Niikura et al. |
| 5,995,095 | A | 11/1999 | Ratakonda |
| 6,011,868 | A | 1/2000 | Van den Branden et al. |
| 6,091,772 | A | 7/2000 | Anderson et al. |
| 6,219,043 | B1 | 4/2001 | Yogeshwar et al. |
| 6,327,390 | B1 | 12/2001 | Sun et al. |
| 6,535,239 | B1 | 3/2003 | Kim |
| 6,671,520 | B1 | 12/2003 | Kim |
| 6,772,392 | B1 | 8/2004 | Kawada et al. |
| 6,915,263 | B1 | 7/2005 | Chen et al. |
| 7,002,637 | B2 | 2/2006 | Szybiak et al. |

FOREIGN PATENT DOCUMENTS

| | | |
|---|---|---|
| EP | 054431 A2 | 6/1993 |
| EP | 0544431 A2 | 6/1993 |

*Primary Examiner*—Jose L Couso

(57) ABSTRACT

Methods and an apparatus for monitoring compressed bitstreams are disclosed. The disclosed methods and apparatus receive an encoded signal including encoded video frames and determine if video represented by the encoded video frames is frozen or blacked out based on a comparison of sizes of the encoded frames.

20 Claims, 6 Drawing Sheets

METHODS AND APPARATUS FOR MONITORING COMPRESSED BITSTREAMS

CROSS REFERENCE TO RELATED APPLICATIONS

The present application is a continuation of U.S. patent application Ser. No. 10/425,120 entitled "METHODS AND APPARATUS FOR MONITORING COMPRESSED BITSTREAMS," by Hanno Basse, filed Apr. 28, 2003, which application is hereby incorporated by reference herein.

TECHNICAL FIELD

The present disclosure pertains to information distribution systems and, more particularly, to methods and apparatus for monitoring compressed bitstreams.

BACKGROUND

Information distribution systems, such as cable and satellite television systems, including transmission stations and reception stations have become so prevalent that most consumers take them for granted. The wide bandwidth available in some digital information distribution systems allows content providers to provide viewers with vast amounts of programming content. For example, while past conventional analog cable television systems provided viewers with tens of channels, modern satellite television systems, such as, for example, the DIRECTV® system provides viewers with literally hundreds of choices of programming content. As a further example, while analog cable systems provided viewers with one HBO channel, modern digital systems provide viewers with as many as six HBO channels, each of which includes different program content.

System operators who are quality-minded monitor the information that is broadcast over their systems to ensure that broadcast audio and video quality are acceptable. For example, concerned system operators may monitor video for the presence of quality issues such as video freeze (a situation in which video information provided to viewers appears frozen), video blackout (a situation in which black video, rather than desired visual content, is being broadcast to viewers) and/or audio silence that is not a desirable part of the programming. The presence of any one of these quality issues causes concerned system operators to scramble to fix the outgoing programming quality provided to users.

Traditionally, because analog cable systems provided relatively few channels of content (e.g., 50 channels), system operators could hire personnel to watch each channel of programming, thereby monitoring quality. Employees would view as many as four channels simultaneously, while watching for the occurrence of video freeze, video blackout or audio silence. As can be readily appreciated, human monitoring of broadcast content was expensive and prone to error, yet it was possible and not economically prohibitive due, in large part, to the few channels being monitored.

The explosion in programming content broadcast by a single provider, as noted above, now means that providers using digital distribution systems are transmitting as many as 800 channels of audio and video. System operators that are still concerned with the quality of broadcast content largely rely on two monitoring techniques: human monitoring and automated monitoring of baseband signals, each of which is described below.

As noted previously, humans watching program content may be asked to make subjective assessments regarding the quality of transmission. For example, humans can watch channels of content waiting for the occurrence of a video freeze, a video blackout or audio silence. Again, human labor is expensive, especially given the need to monitor as many as 800 channels of content. To minimize the number of humans needed to monitor video signals, monitor walls displaying multiple channels of content are used. However, the effectiveness of such an approach is inversely proportional to the number of channels simultaneously monitored, due to the limitations of the human viewers. Additionally, humans cannot reliably listen to numerous audio sources in parallel, therefore audio signals need to be monitored in sequence, which significantly increases the time and manpower required to detect silent audio or audio outages. In addition to the human factors associated with monitoring transmission content, a substantial quantity of hardware is required to facilitate the monitoring. For example, a monitoring installation must include a number of video displays and decoder banks because each encoded signal must be decoded and displayed to the viewers. The result can be as many as 800 decoders, which contributes significant expense to the monitoring operation.

As an alternative to human monitoring of transmissions, automated monitoring has been used. Automated monitoring systems process baseband video and audio signals (i.e., audio and video signals that are uncompressed or decoded) in search of signal quality issues. Automated monitoring, like human monitoring, has been traditionally performed on decoded signals, therefore decoders are required for each channel that is to be monitored, again resulting in the need for as many as 800 decoders. To reduce the number of decoders that are required, system operators may use decoders in a sequential manner, scanning one channel after another. However, using decoders in a sequential manner extends the time it takes for the monitoring system to detect frozen or blacked out video or silent audio. In addition to the oppressive cost of the numerous decoders, the cost of the monitoring equipment that analyzes the output from the decoders is significant.

DETAILED DESCRIPTION

Although the following discloses example systems including, among other components, software executed on hardware, these systems are merely illustrative and should not be considered as limiting. For example, any or all of the disclosed hardware and software components could be embodied exclusively in dedicated hardware, exclusively in software, exclusively in firmware or in some combination of hardware, firmware and/or software.

In addition, while the following disclosure is made with respect to example DIRECTV® broadcast services and systems, it should be understood that many other delivery systems are readily applicable to disclosed system. Such systems include wired or cable distribution systems, ultra-high frequency/very-high frequency (UHF/VHF) radio frequency systems or other terrestrial broadcast systems (e.g., microwave multipoint distribution systems (MMDS), local multipoint distribution services (LMDS), etc.), and fiber optic networks. One particular example system includes a digital cable system or any other suitable system in which information is distributed in a compressed format. Accordingly, while the following describes example systems and processes, persons of ordinary skill in the art will readily appreciate that the disclosed examples are not the only way to implement such systems.

Figure 1:
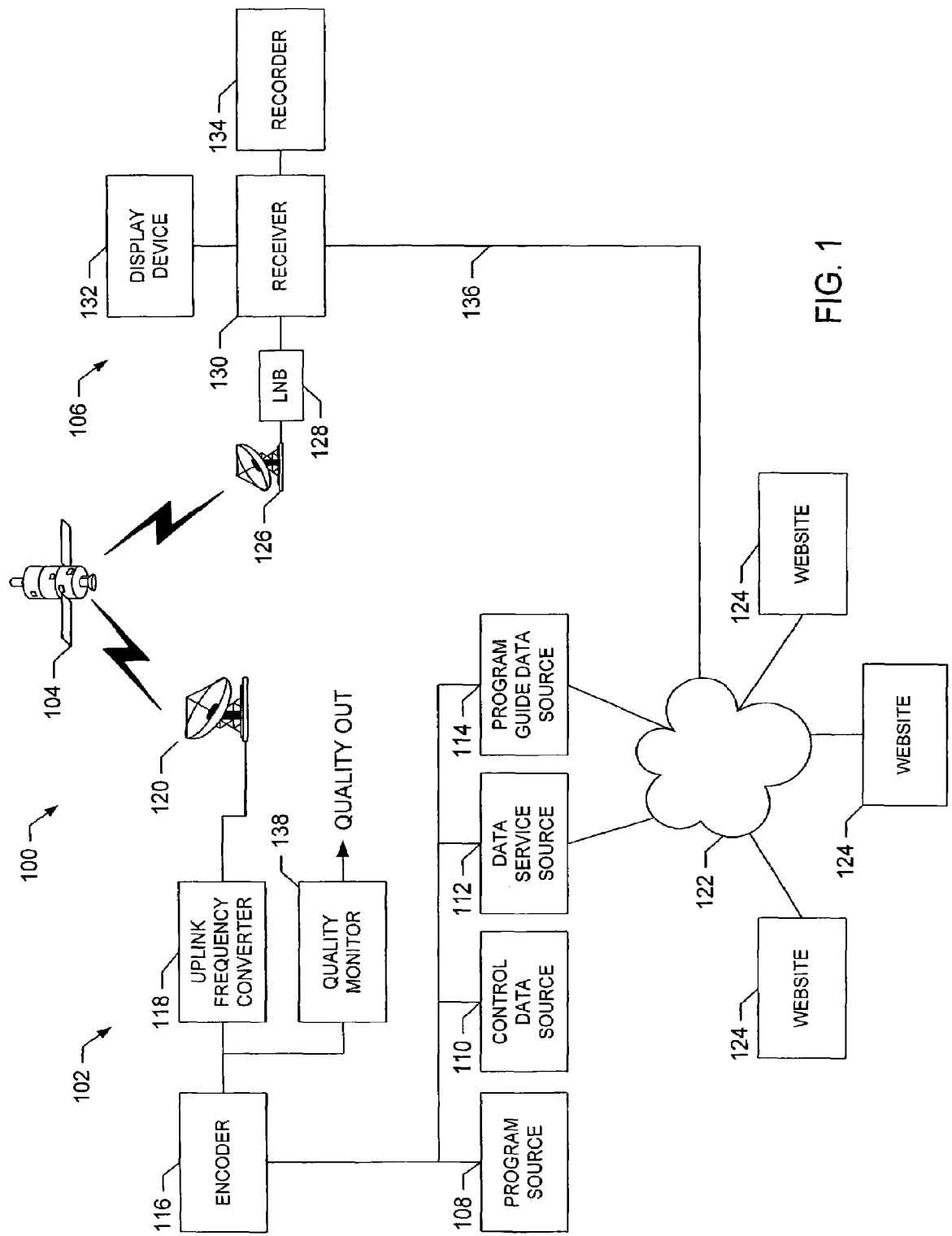
FIG. 1 is a example diagram of an example information distribution system.

As shown in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geo-synchronous or geo-stationary satellite that, in turn, rebroadcasts the information over broad geographical areas on the earth that include receiver stations 106.

In further detail, the example transmission station 102 of FIG. 1 includes a program source 108, a control data source 110, a data service source 112 and one or more program guide data sources 114. During operation, information from one or more of these sources 108-114 is passed to an encoder 116, which encodes the information into a packetized, compressed and multiplexed bitstream for broadcast to the satellite/relay 104. Encoding includes, for example, converting the information into data streams that are multiplexed into a packetized data stream or bitstream using a number of conventional algorithms. In one particular example, the encoder 116 encodes information it receives into a motion picture expert group (MPEG)-2 format. As will be readily appreciated by those having ordinary skill in the art, MPEG-2 encoding includes the creation of intraframes (I-frames), predicted frames (P-frames) and bidirectional frames (B-frames). After encoding, a header is attached to each data packet within the packetized data stream to facilitate identification of the contents of the data packet. The header also includes a service channel identifier (SCID) that identifies the data packet. As will be readily appreciated by those having ordinary skill in the art, a SCID is on particular type of program identifier (PID).

To facilitate the broadcast of information, the encoded information is passed from the encoder 116 to an uplink frequency converter 118 that modulates a carrier wave and passes the modulated carrier wave to an uplink antenna 120, which broadcasts the information to the satellite/relay 104 in a conventional manner.

Turning now to the information sources 108-114, the programming source 108 receives video and audio programming from a number of sources, including satellites, terrestrial fiber optics, cable or tape. The video and audio programming may include, but is not limited to, television programming, movies, sporting events, news, music or any other desirable content.

Control data contained in the control data source 110 may include data representative of a list of SCIDs to be used during the encoding process, or any other suitable information. Like the programming sources 108, the control data source 110 passes control data to the encoder 116 so that such information may be distributed throughout the system 100.

The data service source 112 receives data service information and webpages made up of text files, graphics, audio, video, software, etc. Such information may be provided via a network 122. In practice, the network 122 may be the Internet, a local area network (LAN), a wide area network (WAN) or a conventional public switched telephone network (PSTN) in any combination thereof. The information received from various sources is compiled by the data service source 112 and provided to the encoder 116. For example, the data service source 112 may request and receive information from one or more websites 124. The information from the websites 124 may be related to the program information provided to the encoder 116 by the program source 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. As is known to those having ordinary skill in the art, the receiver station 106 gathers the SCIDs related to the game, wherein the program guide data source 114 has previously provided to the receiver station 106 a list of SCIDs that correspond to the game.

As noted previously, the satellite/relay 104 receives the modulated, encoded Ku-band bitstream from the transmission station 102 and re-broadcasts it downward toward an area on earth that includes the receiver station 106. As shown in FIG. 1, the example receiver station 106 includes a reception antenna 126 connected to a low-noise-block (LNB) 128 that is further connected to a receiver 130. The receiver 130 may be a set-top box or may be a personal computer (PC) having a receiver card installed therein. A display device 132, such as, for example, a television set or a computer monitor, is coupled to the receiver 130 for displaying received programming to a user. Additionally, the example receiver station 106 may include a recorder 134 used to record programming received by the receiver station 106. The recorder 134 may be, for example, a device capable of recording information on media, such as videotape or digital media such as a digital versatile disk (DVD), a compact disk (CD) or any other suitable media.

In operation of the receiver station 106, the reception antenna 126 receives signals including a bitstream from the satellite 104. The signals are coupled from the reception antenna 126 to the LNB 128, which amplifies and, optionally, downconverts the received signals. The LNB output is then provided to the receiver 130, which, as described in detail below, receives, depacketizes, demultiplexes and decodes the received signal to provide audio and video signals to the display device 132 and the recorder 134. The receiver 130 is responsive to user inputs to tune to a particular program, by selecting and decoding a particular frequency and the particular SCIDs on which the desired program is located.

Although not necessary for proper operation of the disclosed system, the receiver station 106 may optionally incorporate a connection 136 (e.g., Ethernet circuit or modem for communicating over the Internet) to the network 122 for transmitting requests and other data back to the transmission station 102 (or a device managing the transmission station 102 and overall flow of data in the system 100) and for communicating with websites 124 to obtain information therefrom.

Also shown in FIG. 1 is a quality monitor 138 that is coupled to the output of the encoder 116 and, thereby, receives the packetized bitstream for transmission. In general, the quality monitor 138 receives the compressed bitstream output by the encoder 116 and determines, without decoding the bitstream, if a video freeze, a video blackout or audio silence is occurring on any of the channels processed by the encoder 116. The output from the quality monitor 138 (quality out) may be used as a feedback indication that video freeze and/or blackout and/or audio silence is detected in the bitstream. As described below, the quality monitor may be, for example, implemented in software operating on hardware such as, for example, a microprocessor.

Figure 2:
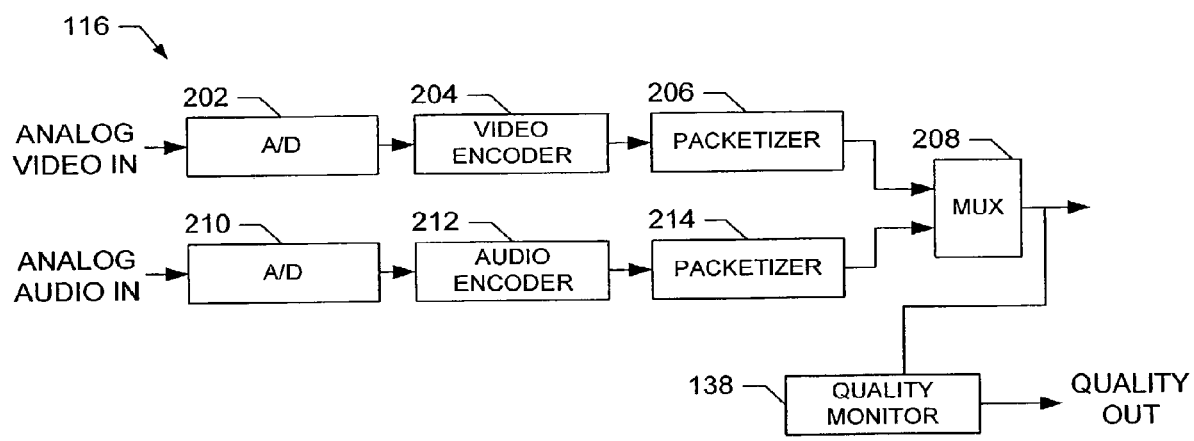
FIG. 2 is a diagram of an example of the encoder of FIG. 1.

As shown in FIG. 2, the encoder 116 includes, for example, a video analog-to-digital converter (A/D) 202, a video encoder 204 and a video packetizer 206. The output of the video packetizer 206 is coupled to a multiplexer 208. The encoder 116 also includes an audio lineup including an audio A/D 210, an audio encoder 212 and an audio packetizer 214, the output of which is coupled to the multiplexer 208. The outputs of the multiplexer 208 is coupled to the quality monitor 138 and, as shown in FIG. 1, is further coupled to the uplink frequency converter. Although shown as a separate device from the encoder 116 in the example of FIGS. 1 and 2, the quality monitor 138 could be implemented as part of the encoder 116 and, in particular, as part of the multiplexer in the encoder 116.

In operation, analog video and audio are coupled to the encoder 116, which uses the A/Ds 202, 210 to convert the analog signals into digital signals that are coupled to the video and audio encoders 204, 212. In the alternative, digital video and audio may be coupled directly to the encoders 204, 212, respectively. The video encoder 204 and the audio encoder 212 process the digital bitstreams from the A/Ds 202, 210 (or digital audio and video sources) to form encoded data. The encoded data may be generated in accordance with the MPEG-2 standard. For example, in such an encoding scheme, the information from the video encoder 204 is broken into I, P and B-frames in a known manner. Data from the audio encoder 212 is, in this example, also formatted according to the MPEG-2 standard and, therefore, includes data representative of audio level in various frequency bands. For example, the audio data may include a bit allocation table indicating how bits used to represent audio in various bands are allocated. In such an arrangement, the number of bits allocated to each audio band depends on the power and complexity of the audio signal in the audio band.

The outputs of the encoders 204, 212, which may be referred to as audio and video data, are coupled to packetizers 206, 214, respectively. The packetizers 206, 214 process the audio and video data into packetized formats suitable for multiplexing and transmission to the satellite/relay 104. The multiplexer 208 combines the outputs of the packetizers 206, 214 in a statistical manner that is known to those having ordinary skill in the art. In addition to the multiplexer 208 providing a packetized bitstream for transmission to the uplink frequency converter 118, the multiplexer 208 also couples the packetized and multiplexed bitstream is coupled to the quality monitor 138 that, as described in detail below, analyzes the bitstream for video freeze and blackout and also analyzes the bitstream for audio silence.

Figure 3:
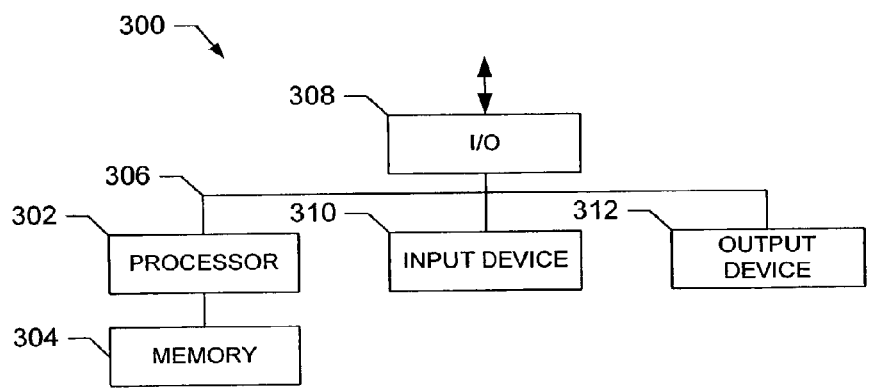
FIG. 3 is a detailed diagram of an example quality monitor of FIGS. 1 and 2.

The quality monitor 138 may be implemented as shown in FIG. 3, as an example processor system 300 including a processor 302 having an associated memory 304, which may be, for example, a random access memory (RAM), a read only memory (ROM) or a flash memory. The processor 302 is coupled to an interface, such as a bus 306 to which other components may be interfaced. In the illustrated example of FIG. 3, the components interfaced to the bus 306 include an input/output (I/O) module 308, an input device 310 and an output device 312.

The example processor system 300 may be, for example, a server or a conventional desktop personal computer, a notebook computer, a workstation or any other computing device. The processor 302 may be any type of processing unit, such as a reduced instruction set computer (RISC), an application specific integrated circuit (ASIC), a multiprocessor system, etc.

The memory 304 that is coupled to the processor 302 may be any suitable memory device and may be sized to accommodate the storage and operational demands of the system 300. The memory 304 stores instructions that cause the processor 302 to act as a quality monitor and to carry out the processes according to the following example description. The memory 304 of the system 300 or some other memory, in one example, is programmed with instructions that implement the quality monitor 138. The instructions may be written in a high level language such as, for example, C or C++ and compiled down to machine executable code stored in the system 300. The execution of the instructions causes the processor 302 to behave in a manner defined by the instructions.

In one example, the I/O module 308 may be an Optibase brand media card that is commercially available and that complies to the digital video broadcast (DVB) asynchronous serial interface (ASI) standard. Of course, Optibase is merely one supplier of such a device and other suitable cards may be selected. The I/O module 308 enables the system 300 to receive the output from the encoder 116 and to store the same in memory 304 or in a mass storage device (not shown) before such data is processed.

The input device 310 may implemented by a keyboard, a mouse, a touch screen, a track pad or any other device that enables a user to provide information to the processor 302.

The output device 312 may be, for example, a liquid crystal display (LCD) monitor, a cathode ray tube (CRT) monitor or any other suitable device that acts as an interface between the processor 302 and a user. The output device 312 as pictured in FIG. 3 includes any additional hardware required to interface a display screen to the processor 302. In conjunction with the disclosed system, the processor 302 may determine quality metrics or may detect the presence of frozen or blacked out video or silent audio for the output from the multiplexer 208 and may display an indication of such on the output device 312 so that the metrics may be reviewed by a user.

It should be noted that while the processor 302 and the memory 304 are shown as being separate and distinct components in FIG. 3, those having ordinary skill in the art will readily recognize that such a representation is merely one example configuration of a processing unit and its associated memory. For example, the processor 302 and the memory 304 could be integrated into one single processing unit including on-board memory.

Figure 4:
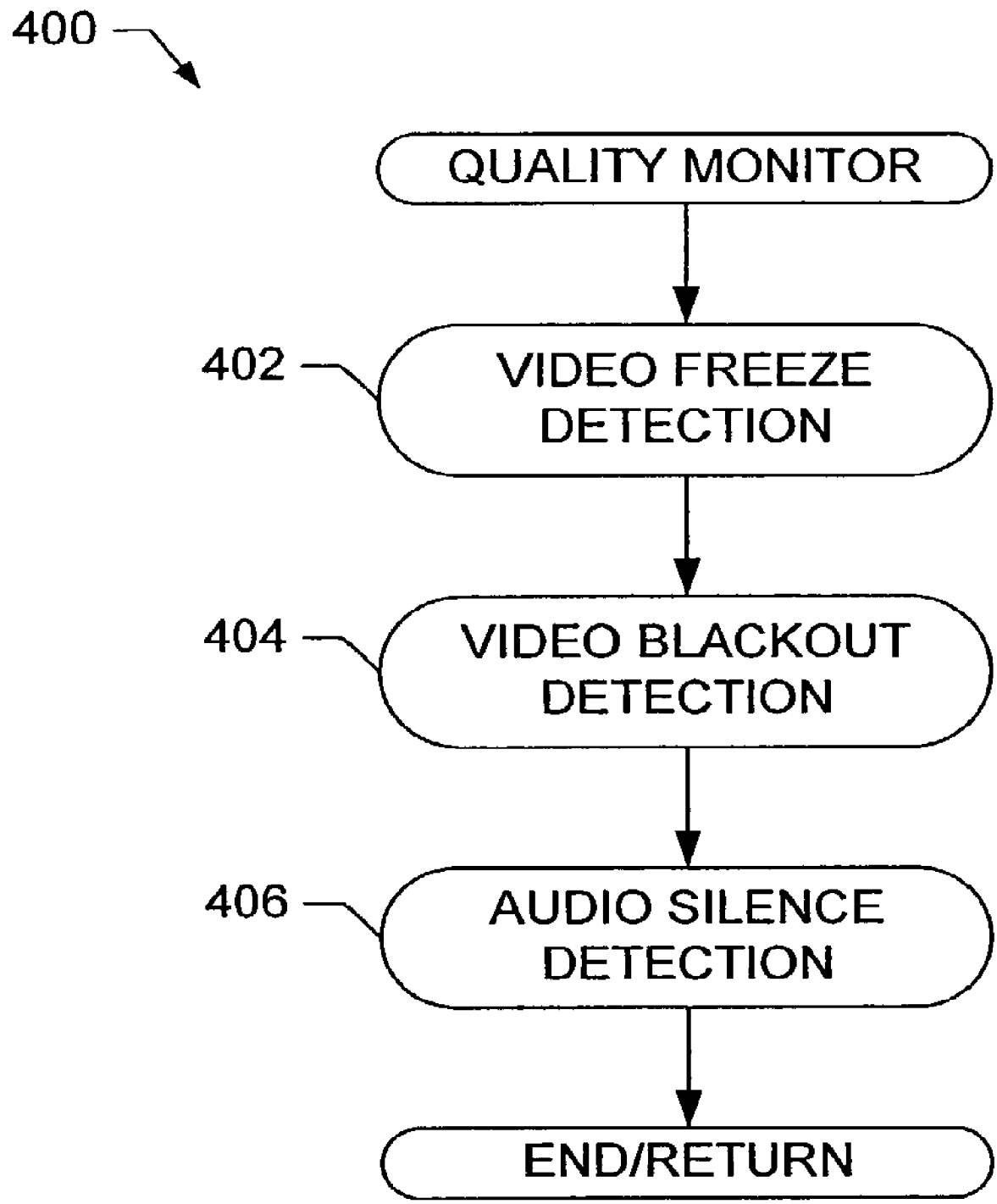
FIG. 4 is flow diagram of an example quality monitor process.

As shown in FIG. 4, a quality monitor process 400 includes a number of sub-processes that may be carried out. For example, the process 400 may include a video freeze detection process 402, a video blackout detection process 404 and an audio silence detection process 406, each of which is described below. The order in which the processes 402-406 may be carried out is not critical and, in fact, the order of the processes 402-406 shown in FIG. 4 is merely one example and other orders of execution may be carried out without deleterious affects on system performance.

Figure 5:
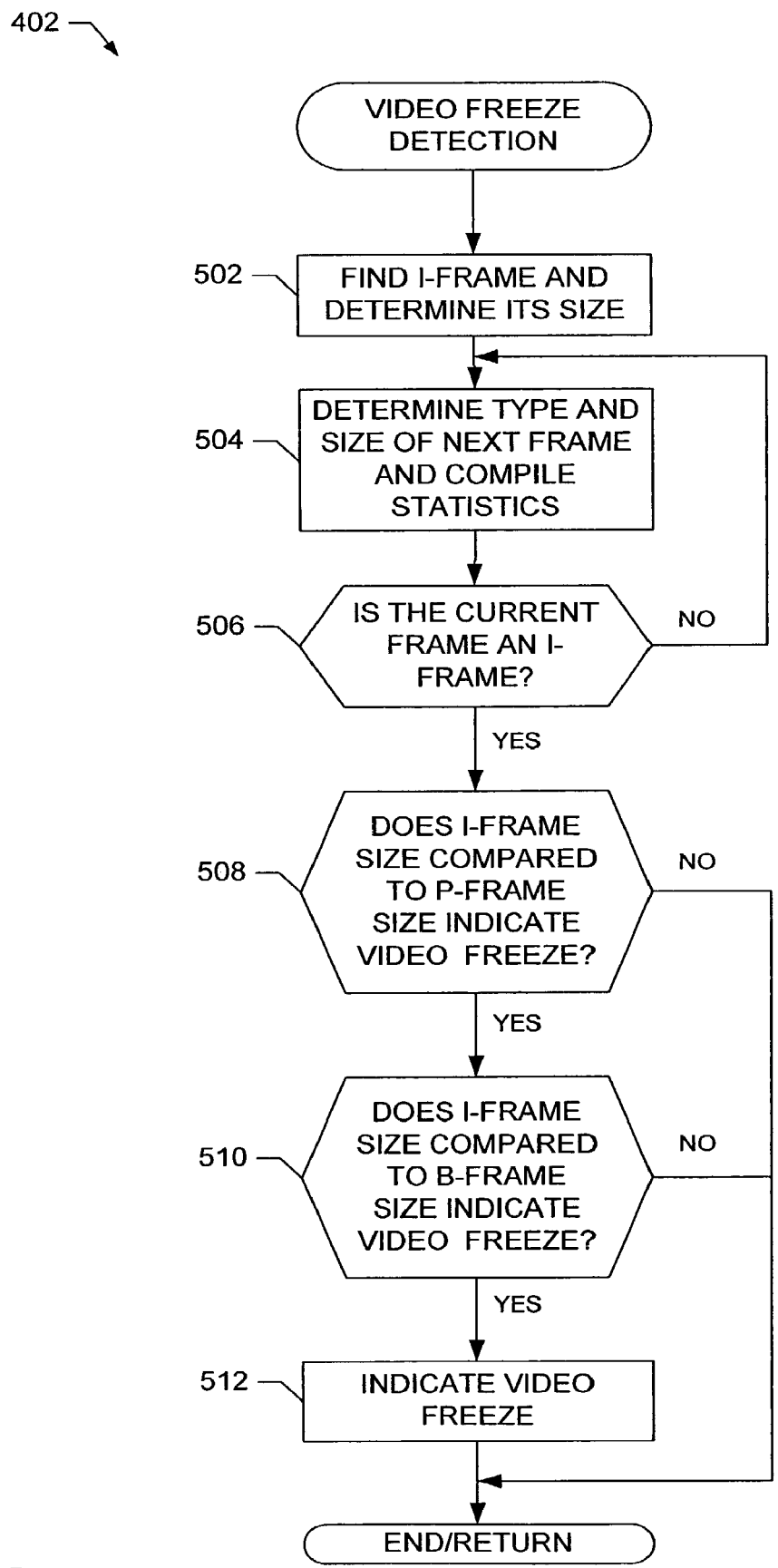
FIG. 5 is a flow diagram of an example video freeze detection process.

The execution of the quality monitor process 400 begins with the execution of the video freeze detection process 402, as described in conjunction with FIG. 5. The video freeze detection process 402 operates on the principle that the size of an encoded frame depends on its type (e.g., I, P or B) and the content of the uncompressed frame it represents. For moving video, the frame size of all three frame types fluctuates over a fairly wide range and the typical ratio of the size of an I-frame compared to a P-frame ranges from about three to six. However, for frozen frames the variation of between the I, P and B-frames is very characteristic in that the P and B-frames are nearly identical and constant size while video is frozen because there is no motion to be encoded. Additionally, for frozen frames, it is characteristic that the size of an I-frame is substantially constant and substantially larger than the P and B-frames. For frozen frames, an I-frame can be as much as 25-30 times larger than the P-frames associated with that I-frame.

The video freeze detection process 402 commences by observing the output bitstream from the encoder 116 until an I-frame is detected and, once an I-frame is detected, determining its size (block 502). Each frame subsequent to the detected I-frame is examined and its type and size are determined and stored (block 504). As each frame is examined, the process 402 determines if the frame being examined is an I-frame (block 506). If the frame being examined is not an I-frame, the type and size of the next frame is determined (block 504). The operations described in conjunction with blocks 502-506 serve to determine the size of an I-frame and the sizes of all P and B-frames associated with that I-frame. Finally, when a subsequent I-frame is detected, the process 402 exits the loop formed by blocks 504 and 506.

If it is determined that a subsequent I-frame is detected (block 506), the size of the first I-frame is compared to the average size of the P-frames associated with the I-frame to determine if a video freeze is occurring (block 508). If the comparison does not indicate that a video freeze is occurring (block 508), the process 402 ends and control is returned to the process 400, which continues execution at the process 404.

In one example, the comparison noted in block 508 may be that of the ratio of the I-frame size to the average P-frame size compared against a first threshold. If the ratio is larger than the first threshold, it is likely that a video freeze is occurring. Although the first threshold will vary based on the type of encoder and encoding scheme selected, the first threshold may be on the order of, for example, 20. However, based on the foregoing, the first threshold may be empirically determined.

Alternatively, if the comparison at block 508 indicates that a video freeze is occurring, the size of the I-frame is compared to the average size of the B-frames associated with that I-frame (block 510) to determine if a video freeze is occurring. If the comparison does not indicate that a video freeze is occurring (block 510), the process 402 ends and returns control to the process 400. Alternatively, if the comparison does indicate that a video freeze is occurring (block 510), the process communicates a video freeze to systems operation personnel (block 512). This indication may include a visual display and/or an audible display.

In one example, the comparison of block 510 may be between the ratio of the size of the I-frame to the average size of the associated B-frames and a second threshold. If the ratio is greater than the second threshold, a video freeze may be occurring. Alternatively, if the ratio is below the second threshold, a video freeze is likely not occurring. The second threshold be may empirically based on the type of the encoder and the type of the encoding, but is, for example, on the order of 20.

Figure 6:
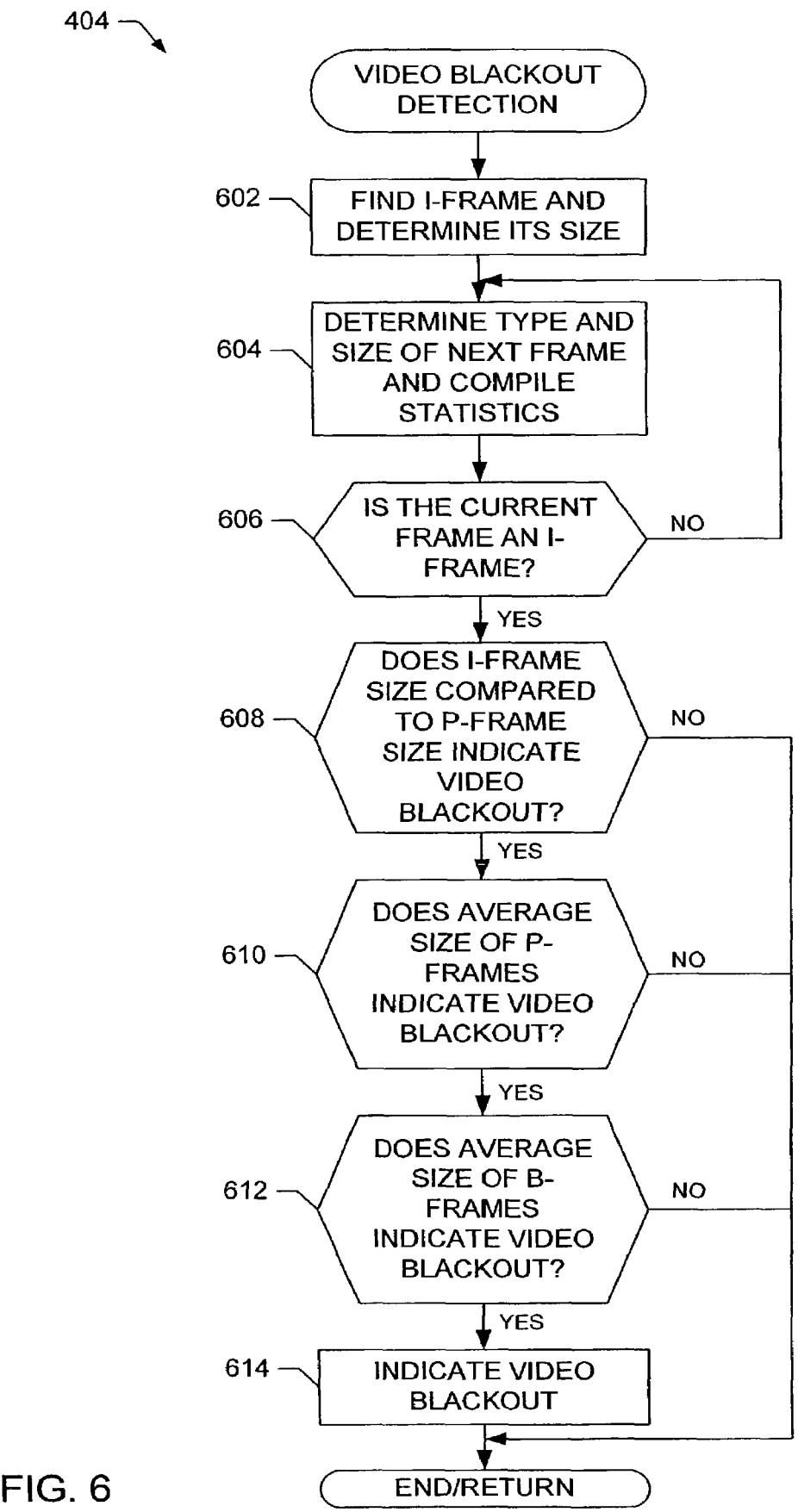
FIG. 6 is a flow diagram of an example video blackout detection process.

After the video freeze is indicated (block 512), control returns to the process 400, which continues execution at the video blackout detection process 404 of FIG. 4, of which additional details are shown in FIG. 6. The video blackout detection process 404 operates on the principle that the sizes of I, P and B-frames for blacked out video are small and of similar size. Accordingly, the ratio of I to P and B-frames will be relatively small (e.g., on the order of three to five) for video blackout.

The video blackout detection process 404 of FIG. 6 commences by observing the output bitstream from the encoder 116 until an I-frame is detected and, once and I-frame is detected, determining its size (block 602). Each frame subsequent to the I-frame is examined and its type and size are determined and stored (block 604). As each frame is examined, the process 404 determines if the frame is an I-frame (block 606). If the frame being examined is not an I-frame, the type and size of the next frame is determined (block 604). The operations described in conjunction with blocks 602-606 serve to determine the size of an I-frame and to determine the sizes of all P and B-frames associated with that I-frame. Finally, when a subsequent I-frame is detected, the process 602 exits the loop formed by blocks 604 and 606.

When a second I-frame is detected (block 606), the size of the first I-frame is compared to the average size of the P-frames associated I-frame to determine if a video blackout is occurring (block 608). If the comparison does not indicate that a video blackout is occurring (block 608), the process 404 ends and control is returned to the process 400, which continues execution at the process 408.

In one example, the comparison of block 608 may be that of the ratio of the I-frame size to the average P-frame size compared against a third threshold. If the ratio is less than the third threshold, it is likely that a video blackout is occurring. Although the third threshold will vary based on the type of encoder and encoding scheme selected, the third threshold may be on the order of, for example, five. However, based on the foregoing, the third threshold may be empirically determined.

If the comparison indicates that a video blackout is occurring (block 608), the average size of the P-frames is compared to a fourth threshold to determine if a video blackout is occurring (block 610). If the comparison does not indicate that a blackout is occurring (block 610), the process returns control to the process 400.

Alternatively, if the comparison does indicate that a blackout is occurring (block 610), the average size of the B-frames is compared to a fifth threshold (block 612). If the comparison does not indicate that a blackout is occurring, the process 404 ends and control returns to the process 400. Alternatively, if the comparison does indicate that a video blackout is occurring (block 612), an indication of the video blackout is communicated to a user via a visual or audible alarm. After the indication of video blackout is made, the process 404 ends and control returns to the process 400 of FIG. 4, which continues execution by carrying out the audio silence detection process 406.

Because video blackout results in P and B-frames having small sizes, the fourth and fifth thresholds may be on the order of 25,000 bits. Like the prior thresholds noted, the fourth and fifth thresholds may be empirically determined and depend on the type of encoder and encoding scheme used. The example fourth and fifth thresholds of 25,000 bits are based on a system having an overhead of approximately 25,000 bits.

With regard to audio processing, as noted previously MPEG encoding divides audio signals into frequency sub-bands and partitions the signals into frames in the temporal domain. The encoder allocates each frequency sub-band a number of bits to be used for the coded representation of the signal portion contained in that sub-band. Generally, for varying audio content, the bit allocation varies significantly between the sub-bands within the same frame and also varies between the same sub-bands in different frames. However, if the signal input to the encoder is silent, the signal level is relatively constant across the sub-bands and is substantially constant between the same sub-bands of different frames.

Figure 7:
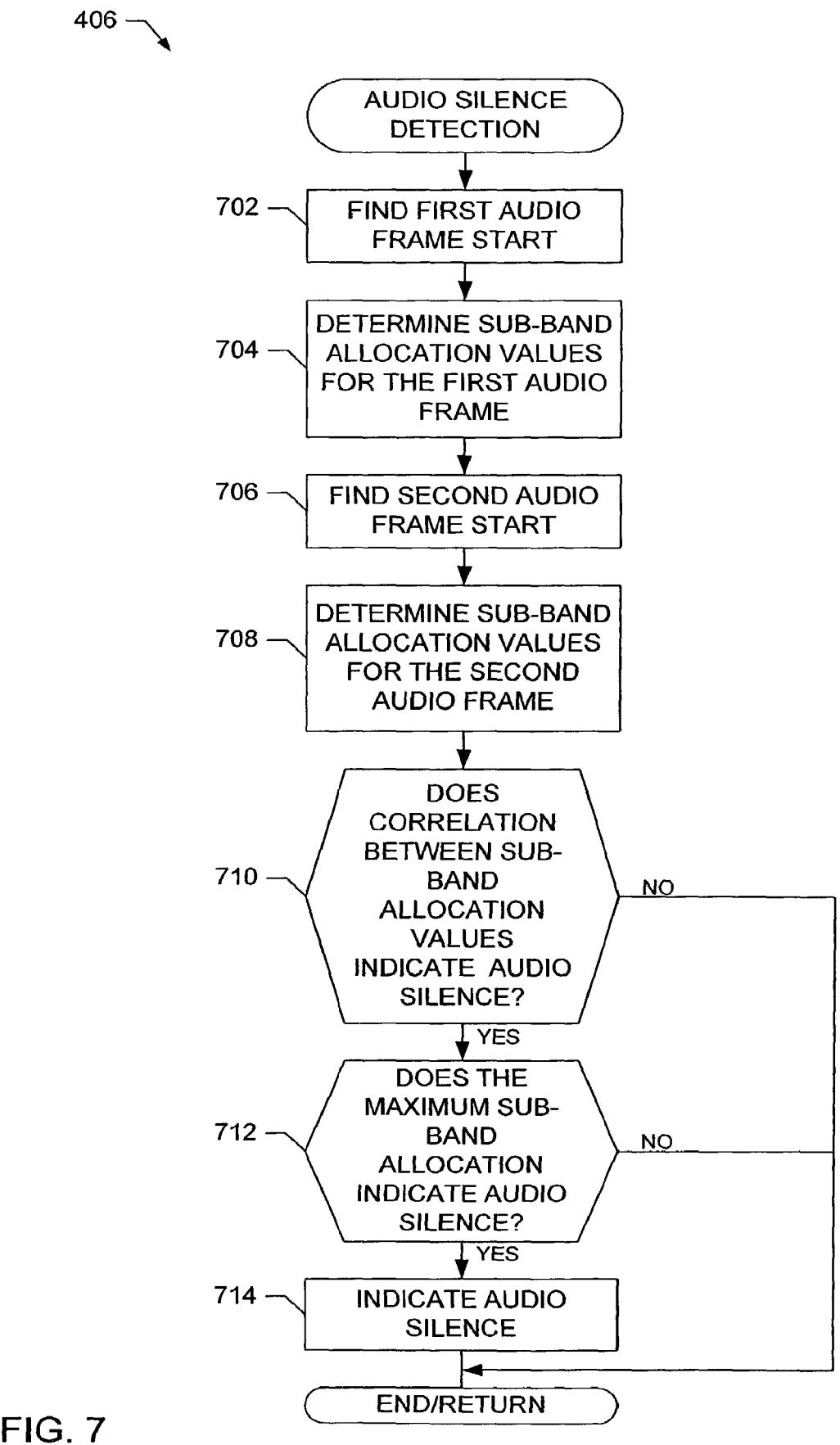
FIG. 7 is a flow diagram of an example audio silence detection process.

FIG. 7 shows additional detail of the audio silence detection process 406. After the process 406 is commenced, the start of a first audio frame is found (block 702) and the audio sub-band allocation values for the first audio frame are determined (block 704). The process 406 continues to find the start of a second audio frame (block 706) and to determine the sub-band allocation values for the second audio frame (block 708).

After the sub-band allocation values have been obtained (blocks 704, 708), the process 406 correlates the sub-band values and determines if the correlation indicates audio silence (block 710). The correlation between the sub-band allocation values may be carried out as represented by Equation 1, below.

$$\rho = \frac{\frac{1}{n-1}\sum_{j=1}^{n}(X_j - \mu_x)(Y_j - \mu_y)}{\sigma_x \sigma_y} \quad \text{Equation 1}$$

The terms of Equation 1 are defined as follows:
n—the number of sub-bands encoded in the stream
$X_j$—values of sub-band allocation in the current audio frame
$Y_j$—values of sub-band allocation in the previous audio frame
$\mu_x$—average of the sub-band allocation valued for the current audio frame
$\mu_y$—average of the sub-band allocation values for the previous audio frame
$\sigma_x$—standard deviation of the sub-band allocation values for the current audio frame
$\sigma_y$—standard deviation of the sub-band allocation values for the current audio frame If the correlation does not exceed a sixth threshold (block 710), it is unlikely that audio silence is occurring and, therefore, the process 406 ends. The sixth threshold may be empirically determined and may depend on the type of encoder and encoding used on the audio. However, in one example, the sixth threshold may about 0.95 so that any correlation over 0.95 indicates audio silence and any correlation below 0.95 indicates no audio silence.

If the correlation does exceed the sixth threshold (block 710) the process 406 determines if the maximum sub-band allocation indicates audio silence (block 712). The maximum sub-band allocation may be compared to an empirically-determined seventh threshold that is on the order of, for example, six. In keeping with the example, if the maximum sub-band allocation is above the seventh threshold of six, the process 406 ends and returns control to the process 400. Alternatively, if the maximum sub-band allocation is less than the threshold of six, the process 406 indicates that audio silence is present (block 714). As with prior indications, the indication made by the process 406 may be audible or visual in nature.

Although certain apparatus constructed in accordance with the teachings of the invention have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of monitoring broadcast quality, comprising:
    receiving an encoded signal including encoded frames at a processor, wherein the encoded signal further comprises encoded audio having frames including sub-band allocation values;
    determining, at a processor, if video represented by the encoded frames includes one or more of a video freeze and a video blackout; and
    determining, at a processor, if audio represented by the encoded signal is substantially silent based on the sub-band allocation values.

2. The method of claim 1, wherein determining if video represented by the encoded frames includes one or more of a video freeze and a video blackout comprises comparing a first frame type and a second frame type.

3. The method of claim 1, wherein the encoded signal comprises a motion picture experts group (MPEG) encoded signal.

4. The method of claim 3, wherein determining if video represented by the encoded frames includes one or more of a video freeze and a video blackout comprises comparing an I-frame size and an average P-frame size.

5. The method of claim 4, wherein determining if video represented by the encoded frames includes one or more of a video freeze and a video blackout comprises comparing an I-frame size and an average B-frame size.

6. The method of claim 1, wherein determining if audio represented by the encoded signal is substantially silent comprises correlating sub-band allocation values of at least two audio frames.

7. The method of claim 6, wherein determining if audio represented by the encoded signal is substantially silent further comprises comparing a maximum sub-band allocation to a threshold.

8. A computer accessible medium storing a plurality of computer accessible instructions that, when executed, cause a computer to:
    receive an encoded signal including encoded video frames wherein the encoded signal further comprises encoded audio having frames including sub-band allocation values;
    determine if video represented by the encoded video frames includes one or more of a video freeze and a video blackout; and
    determine if audio represented by the encoded signal is substantially silent based on the sub-band allocation vales.

9. The computer accessible medium of claim 8, wherein the encoded signal comprises a motion picture experts group (MPEG) encoded signal.

10. The computer accessible medium of claim 9, wherein the determination whether video represented by the encoded video frames includes one or more of a video freeze and a video blackout comprises a comparison of an I-frame size and an average P-frame size.

11. The computer accessible medium of claim 10, wherein the determination whether video represented by the encoded video frames includes one or more of a video freeze and a video blackout comprises a comparison of an I-frame size and an average B-frame size.

12. The computer accessible medium of claim 8, wherein determining if audio represented by the encoded signal is substantially silent comprises correlating sub-band allocation values of at least two audio frames.

13. The computer accessible medium of claim 12, wherein determining if audio represented by the encoded signal is substantially silent further comprises comparing a maximum sub-band allocation to a threshold.

14. A transmission station, comprising:
  program source means for providing content including audio and video;
  encoder means, coupled to the program source means, for generating an encoded signal including encoded video frames of the content;
  uplink frequency converter means coupled to the encoder means for converting the encoded signal into a signal for transmission; and
  a processor coupled to the encoder means, for receiving the encoded signal including encoded video frames and for determining if video represented by the encoded video frames includes one or more of a video freeze and a video blackout based on a comparison of sizes of the encoded frames.

15. The transmission station of claim 14, wherein the comparison of sizes of the encoded frames comprises a comparison of a first frame type and a second frame type.

16. The transmission station of claim 14, wherein the encoded signal comprises a motion picture experts group (MPEG) encoded signal.

17. The transmission station of claim 16, wherein the comparison of sizes of the encoded frames comprises a comparison of an I-frame size and an average P-frame size.

18. The transmission station of claim 14, wherein the encoded signal further comprises encoded audio having frames including sub-band allocation values and wherein the quality monitor means is further configured to cause the machine to determine if audio represented by the encoded signal is substantially silent based on the sub-band allocation values.

19. The transmission station of claim 18, wherein determining if audio represented by the encoded signal is substantially silent comprises correlating sub-band allocation values of at least two audio frames.

20. The transmission station of claim 19, wherein determining if audio represented by the encoded signal is substantially silent further comprises comparing a maximum sub-band allocation to a threshold.

* * * * *